Patented Oct. 1, 1946

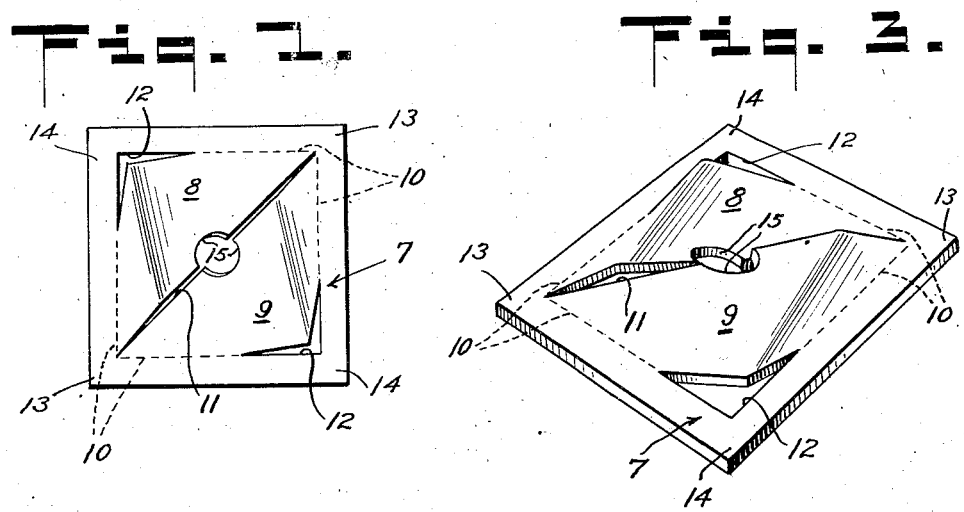
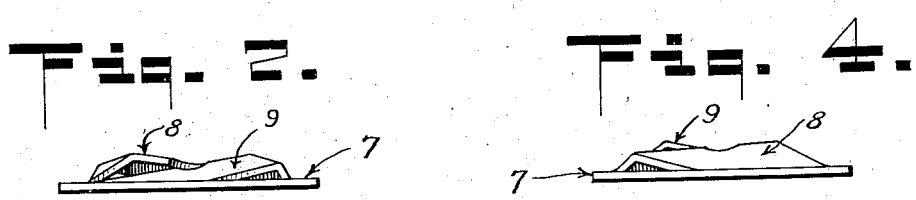
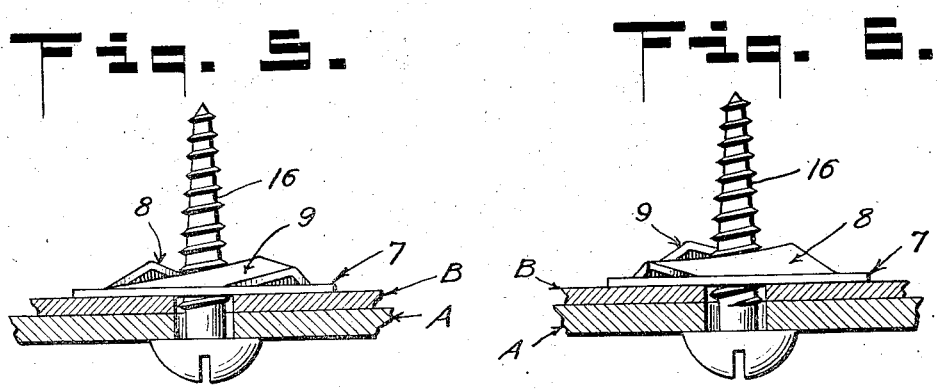

2,408,573

UNITED STATES PATENT OFFICE 2,408,573

SHEET METAL NUT

Eugene M. Morehouse, Tujunga, Calif., assignor to Adel Precision Products Corp., a corporation of California Application August 28, 1945, Serial No. 613,113

4 Claims. (Cl. 85—36)

This invention relates to sheet metal nuts of the type wherein a sheet metal body portion is formed with opposed bridge portions constructed and arranged to have a resilient screw-threaded engagement with a screw-threaded member turned therebetween.

More particularly the present invention relates to improvements in sheet metal nuts of the type shown in my application for patent for Self locking nut, Serial No. 561,221, filed October 31, 1944, which became Letters Patent No. 2,393,054 on January 15, 1946, wherein the bridge portions have their ends joined to the body portion of the nut along lines which are diagonal to the longitudinal axes of the bridge portions whereby the threading edges of the bridge portions are caused to bite into the screw as the bridge portions are flexed upon tightening the screw.

The present invention has for its primary object the provision of a sheet metal nut of the general character next above described which embodies the advantages and improvements as follows:

1. An inward thrust of the bridge portions against the nut at points approximately 90 degrees apart when the screw is tightened and the bridge portions are thereby flexed inwardly, whereby a reliable locking of the nut on the screw is assured.

2. The provision of flexible and resilient bridge portions of comparatively greater size and strength having considerable resiliency, with such portions constituting the greater part of the sheet metal body, whereby a strong and highly resilient nut having a more effective locking action may be provided with a minimum of metal which may be readily stamped to form the finished product.

3. The provision of a greater area of resilient portions than heretofore provided in sheet metal nuts, thereby assuring a maximum holding action with a minimum amount of metal.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a top plan view of a nut embodying the present invention;

Fig. 2 is a side elevation of the nut;

Fig. 3 is a perspective view of the nut;

Fig. 4 is a side elevation of the nut taken at right angles to Fig. 2;

Fig. 5 is a side elevational and part sectional view showing the nut as employed with a screw to hold two members together;

Fig. 6 is a side view similar to Fig. 5 but taken at right angles thereto.

Referring to the drawing more specifically, 7 designates a plate-like resilient sheet metal nut body portion which as here shown is, for example, substantially square, and provided with two substantially triangular bridge portions 8 and 9 formed integral with the body portions at their ends as indicated by the dotted lines 10 in Figs. 1 and 3. These bridge portions are formed by means of a diagonal slit 11 and two L-shaped or right angular slits 12 and for the most part are disposed out of the plane of the body portion 7. The diagonal slit 11 extends from points adjacent diagonally opposite corners 13 of the body portion whereas the L-shaped slits 12 are formed adjacent the other diagonally opposite corners 14 of the body portion. The legs of the L-shaped slits are of equal length and extend but part way along the sides of the body portion in parallel and equi-distantly spaced relation to the outer margins of said sides. The "ends" of the bridge portions 8 and 9, as indicated by the dotted lines 10, extend from the ends of the L-shaped slits 12 to the diagonal slit 11 and are substantially equal in width to the width of the bridge portions on diagonal lines extending between the corners 14.

Formed in the opposed edges of the bridge portions 8 and 9 are complementary arcuate edge portions 15 defining a screw-receiving opening in the center of the body portion and which is intersected by the slit 11.

In order to give the edge portions 15 the proper helix angle to threadedly engage a screw such as the one 16 shown in Figs. 5 and 6 the bridge portions are struck out from the plane of the body portion 7 and arranged so as to be oppositely inclined between their ends. This distortion of the bridge portions is permitted by reason of the diagonal slit 11 and the L-shaped slits 12, it being noted that the edges of the bridge portions defined by the slits 11 and 12 are spaced from one another and the body portion 7 which latter constitutes a small rectangular frame having relatively narrow side portions after the bridge portions are formed.

It will now be seen that the greater part of the blank of which the nut is formed is encompassed by the relatively large and long bridge portions 8 and 9 which are therefore quite flexible and yet dimensioned to have adequate strength also afford a reliable gripping and holding of the screw turned therebetween.

When the screw is tightened in the nut, the two bridge portions 8 and 9 will flex inwardly in such manner as to cause the edges 15 to bite into the screw and so remain under the tension of the flexed bridge portions whereby the nut will be securely locked on the screw in a most reliable manner.

Due to the diagonal and L-shaped slits 11 and 12 respectively and the manner in which the "ends" of the bridge portions are joined to the body portion, the flexure thrusts take place in directions normal to lines of connection of said ends to the body portion. Thus the bridge portions are given thrusts radially inwardly toward the center of the screw-receiving opening at points about 90 degrees apart whereby the edges 15 will be forced inwardly and bite into the screw. This arrangement provides for balanced and centered forces which equalize the stresses on the nut as a whole and assure a reliable locking of the nut on the screw.

Figs. 5 and 6 show how the nut and screw may be employed to secure members A and B together. When the screw is tightened the bridge portions will be bowed inwardly somewhat between their ends but will spring back to normal position upon loosening the screw.

While the nut as here shown is substantially square and the bridge portions 8 and 9 are triangular with their apices defined by the L-shaped or right angular slits 12 and their bases defined by the diagonal slit 11, it should be understood that variations in these shapes may be made provided the bridge portions are formed so that they will be thrust inwardly and radially towards the screw at points about 90 degrees apart when the bridge portions are flexed upon tightening the screw. This feature is the result of having the "ends" of the opposed or side-by-side bridge portions 8 and 9 joined to the body portion along lines extending at right angles to one another and by having the long slit 11 extend diagonally with respect to such right angular lines. Thus, as long as this arrangement of the slits and joint lines of the ends of the bridge portions are present, the shape of the body and the shape of the bridge portions may be varied without departing from the present invention. However, the present shapes make it possible to provide a most efficient nut in which a maximum holding action is afforded with a minimum of sheet metal.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a sheet metal nut, a sheet metal body portion, and a pair of opposed bridge portions formed on said body portion with their corresponding ends joined to said body portion on lines extending at right angles to one another and their adjacent edges extending diagonally across the body portion from the points where said right angular lines meet one another, there being angular slits in the body portion defining edges of said bridge portions which are separated from said body portion; the adjacent edges of said bridge portions being formed with edge portions for engaging the threads of a screw turned therebetween.

2. In a sheet metal nut, a rectilinear sheet metal body portion having a screw-receiving opening approximately centrally thereof and formed with a slit extending diagonally across the body portion from points adjacent certain diagonally opposed corners of the body portion and intersecting said opening, there also being right angular slits formed in the body portion adjacent the other corners thereof whereby the metal of the body portion between said diagonal slit and said right angular slits forms a pair of side-by-side bridge portions of substantially triangular outline, the edges of the triangular bridge portions along the bases thereof having complementary notches therein forming said screw-receiving openings and arranged to threadedly engage a screw turned therebetween.

3. In a sheet metal nut, a rectilinear sheet metal body portion having a screw-receiving opening approximately centrally thereof and formed with a slit extending diagonally across the body portion from points adjacent certain diagonally opposed corners of the body portion and intersecting said opening, there also being right angular slits formed in the body portion adjacent the other corners thereof whereby the metal of the body portion between said diagonal slit and said right angular slits forms a pair of side-by-side bridge portions of substantially triangular outline, the edges of the triangular bridge portions along the bases thereof having complementary notches therein forming said screw-receiving opening and arranged to threadedly engage a screw turned therebetween, the ends of said bridge portions being joined to the body portion along right angular lines whereby upon tightening the screw the bridge portions will flex so that the edges defined by said notches will be forced radially inwardly against the screw to lock the nut thereon.

4. In a sheet metal nut, a resilient sheet metal body portion, a pair of side-by-side bridge portions each for the most part struck out of the plane of the body portion and being separated at opposite edges from the body portion but joined at their ends to the body portion along lines extending at right angles to one another, the opposed edges of the bridge portions extending diagonally across the body portion from the points where said right angular lines meet one another, there being notches in said opposed edges defining a screw-receiving opening.

EUGENE M. MOREHOUSE.